United States Patent [19]
Steiner

[11] 3,938,100
[45] Feb. 10, 1976

[54] VIRTUAL ADDRESSING APPARATUS FOR ADDRESSING THE MEMORY OF A COMPUTER UTILIZING ASSOCIATIVE ADDRESSING TECHNIQUES

[75] Inventor: Louis Kent Steiner, Blaine, Minn.

[73] Assignee: Control Data Corporation, Minneapolis, Minn.

[22] Filed: June 7, 1974

[21] Appl. No.: 477,215

[52] U.S. Cl. ............................................. 340/172.5
[51] Int. Cl.² .................... G06F 9/20; G06F 13/00
[58] Field of Search ................................. 340/172.5

[56] References Cited
UNITED STATES PATENTS

| | | | |
|---|---|---|---|
| 3,292,153 | 12/1966 | Barton | 340/172.5 |
| 3,533,075 | 10/1970 | Johnson | 340/172.5 |
| 3,588,839 | 6/1971 | Belady | 340/172.5 |
| 3,685,020 | 8/1972 | Meade | 340/172.5 |
| 3,693,165 | 9/1972 | Reiley | 340/172.5 |
| 3,761,881 | 9/1973 | Anderson | 340/172.5 |
| 3,764,996 | 10/1963 | Ross | 340/172.5 |
| 3,786,427 | 1/1974 | Schmidt | 340/172.5 |
| 3,839,706 | 10/1974 | Borchsenius | 340/172.5 |

*Primary Examiner*—Gareth D. Shaw
*Assistant Examiner*—James D. Thomas
*Attorney, Agent, or Firm*—Robert M. Angus

[57] ABSTRACT

Apparatus is provided for forming an absolute address for accessing the memory of a computer in which a plurality of associative registers each containing an associative word are arranged in sequential order, each associative word having an absolute page identifier and a virtual page identifier. Means is provided for comparing the virtual page identifier of the associative words with a virtual page identifier of a job program, and means is provided for sequentially shifting the associative words so that the associative word containing the virtual page identifier which corresponds to the virtual page identifier of the job program is placed in the highest ordered associative register.

8 Claims, 7 Drawing Figures

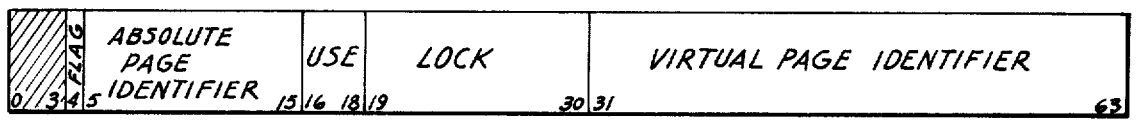
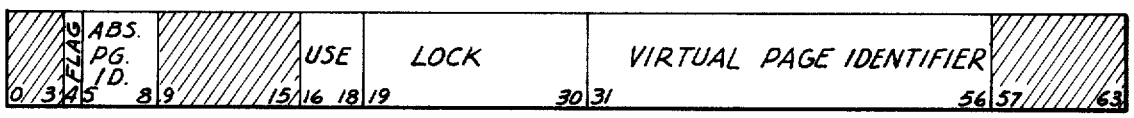
FIG. 2 — ASSOCIATIVE WORD FORMAT
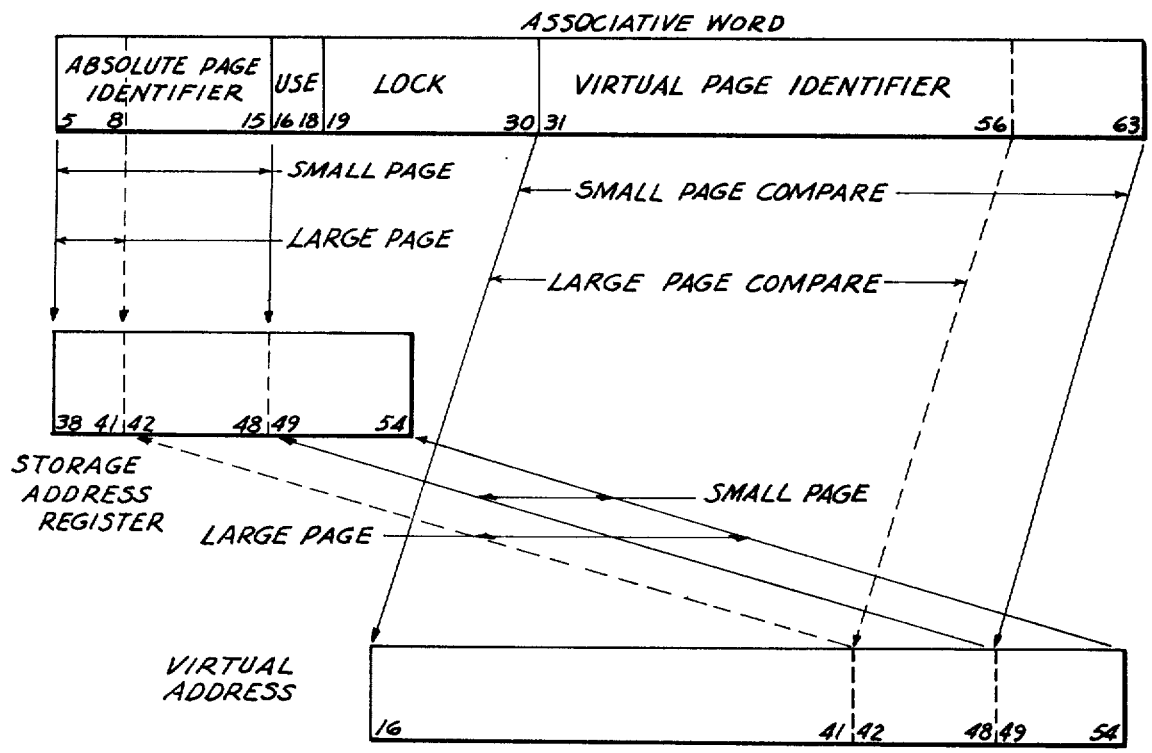
FIG. 3

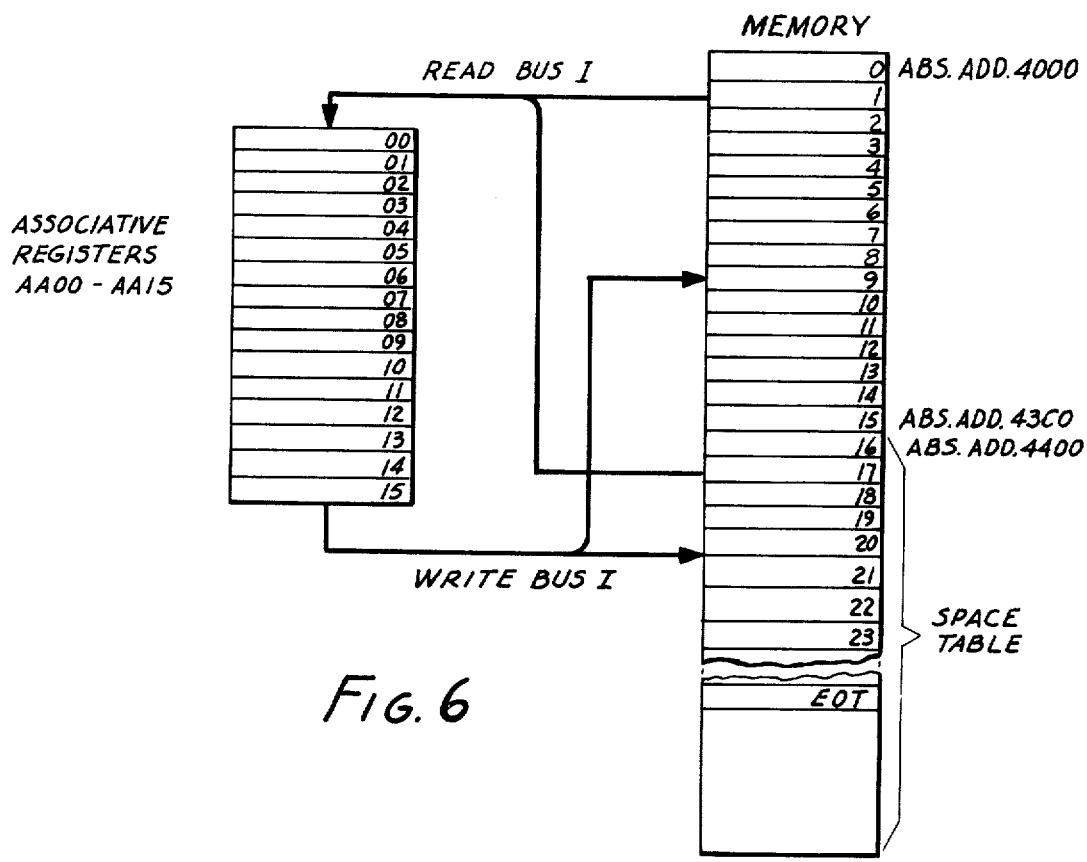

VIRTUAL ADDRESSING APPARATUS FOR ADDRESSING THE MEMORY OF A COMPUTER UTILIZING ASSOCIATIVE ADDRESSING TECHNIQUES

This invention relates to computer addressing techniques, and particularly to apparatus for addressing a computer memory.

Heretofore, "virtual addressing" has been accomplished through the use of computer software to access data and information from a central memory of a computer. The term virtual addressing is often used to denote a form of accessing a central memory wherein the absolute address of information or data to be accessed from the central memory is formed by combining at least two other addresses. For example, the absolute address could be formed through use of a program address combined with an address indicative of the region of the central memory from which desired information is to be retrieved.

One problem associated with prior addressing techniques accomplished through use of software resides in the fact that commonly used information and data, outside of the field length of a job program, must be retrieved by reconstructing the absolute address of the information each time the information is to be accessed.

The present invention is directed to apparatus for arranging at least partial absolute addresses in accordance with the degree of use of each such absolute address. Accordingly, it is an object of the present invention to provide addressing apparatus for a computer in which a plurality of at least partial absolute addresses are at least partially stored in a convenient location for ready access by a job program.

It is another object of the present invention to provide apparatus in which absolute addresses are accessed through use of a plurality of storage registers, with the contents of the storage registers being continuously updated to reference those addresses which are in the greatest use.

Another object of the present invention resides in the provision of addressing techniques wherein pages of data from memory may be accessed through the use of a page table, at least part of which is contained in predetermined associative registers and the remainder of which may be accessed through a space table.

Another object of the present invention resides in the provision of apparatus for addressing the central memory of the computer wherein addresses are sequentially examined through a sequence by which the most heavily used addresses are examined first and, upon exhausting a predetermined number of such addresses, additional addresses may be streamed for examination. If one of such additional addresses is an address to be utilized, that address is thereafter moved into a position of high priority.

In accordance with the present invention, a plurality of associative registers are sequentially arranged to contain associative words which, when accessed by a job program, are utilized to form an absolute address of data or information to be accessed from central memory. In the event that an address in one of the associative registers corresponds to an address of data sought by a job program, the absolute address of the data sought is formed and the data may be retrieved from memory. If, however, the associative registers do not contain the proper address, additional addresses are sequenced from memory through the associative registers until the appropriate address is located.

One feature of the present invention resides in the provision of apparatus for sequentially arranging the addresses in the associative registers so that the addresses in most prominent use are contained in higher ordered associative registers.

Another feature of the present invention resides in the provision of apparatus by which an associative word, when located in the associative registers or in memory is moved to a relatively high priority position in the associative registers.

Another feature of the present invention resides in the provision of apparatus for controlling the associative registers so that when a word, not previously contained in an associative register, is located, such word is thereafter retained in the associative register in a priority location for subsequent use, with lower priority words being shifted down one level of priority.

Yet another feature of the present invention resides in the provision of apparatus for manipulating associative words in the associative registers and the space table so that when a word is moved to a position of higher priority, the gap left at the absolute address of such moved word is filed by shifting other words.

As used herein, when referring to accessing "information" and/or "data" from memory with an address, the terms information and data should be construed in their broadest senses, and include subroutines and other classes of material stored in a computer memory. Thus, the terms should not be limited to material being handled by a computer, but should also include control material for affecting computer operation. Also as used herein, the term job program should be understood to include all instructions to the computer, including those retained in memory as well as those loaded through an input device to affectuate a specific job.

The above and other features of the present invention will be more fully understood from the following detailed description and the accompanying drawings in which:

FIG. 2 is a diagram illustrating the format of associative words useful in connection with the present invention;

FIG. 3 is a flow diagram illustrating a manner of information of absolute addresses for memory access in accordance with the present invention;

FIG. 6 is a flow diagram illustrating the read and write function of the apparatus shown in FIGS. 4 and 5; and FIG. 7 is a diagram illustrating certain word formats useful with the present invention.

Figure 1:
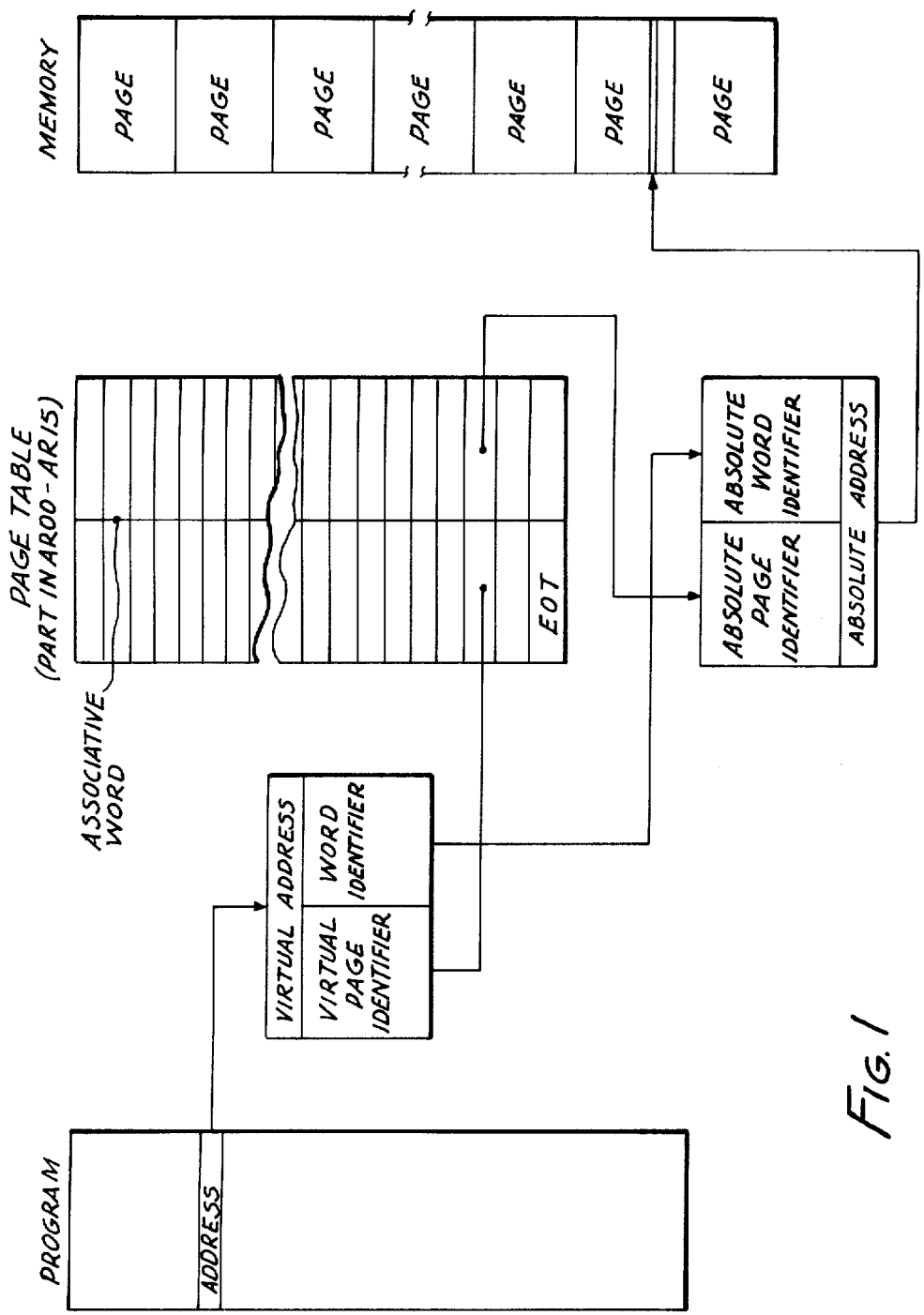
FIG. 1 is a block flow diagram useful in explaining the concept of virtual address as it applies to the present invention.

Referring to the drawings, and particularly to FIG. 1, an absolute address for accessing memory is formed by an instruction from a job program. This address, which may be referred to as a virtual address includes a virtual page identifier and a word identifier. A page table containing a plurality of associative words is utilized to compare and search for the associative word associated with the particular virtual page identifier. When such associative word is located, an absolute page identifier is provided, which when combined with the word identifier from the virtual address, forms an absolute address for access to a particular location in memory. As will be more fully understood hereinafter, the page table is, at least in part, stored in a plurality of registers, such as sixteen associative registers, for ready access by the program. The remaining portion of the page table is stored in memory at a predetermined location hereafter called a space table, as will be more fully understood hereinafter. Preferably, at least one of the associative words near the end of the page table contains a use code indicative that it is the last associative word of the table. Hence, one of the associative words contains an "EOT" (end of table) code.

For purposes of explanation hereinafter, let it be assumed that the data within the memory of the computer is assembled in "pages" and that, for purposes of definition, the page size may follow either of two formats: a large page and a small page. Let it further be assumed that a large page contains 65,536 words, each containing 64 bits, whereas a small page contains 512 64-bit words. It will therefore be appreciated that for a one million word memory, the memory must contain either 16 large pages or nearly 2,000 small pages. It will further be appreciated that for such a one million word memory, 2,000 pages may be independently referenced by an 11-bit absolute page identifier, whereas a 16 large page memory may be accessed by a 4-bit absolute page identifier. Further, it will be appreciated that to access an individual word of a large page containing over 65,000 words, a 16-bit word identifier is required, whereas to access an individual word of a small page containing 512 words, only a 9-bit word identifier is required.

With the foregoing in mind, reference may be had to FIG. 2 which illustrates the absolute word format for a large and a small page. With reference to the top portion of FIG. 2 which illustrates the small page associative word format, a 64-bit associative word is provided in which bits 0 through 3 are not used, bit number 4 is a flag, bits 5 through 15 contain the absolute page identifier, bits 16 through 18 contain a use code, bits 19 through 30 contain a lock code, and bits 31 through 63 contain a virtual page identifier. Likewise, as shown in the lower portion of FIG. 2, the associative word format for a large page comprises a 64-bit word whose bits 0 through 3 are not used, bit 4 is a flag code, bits 5 through 8 contain an absolute page identifier, bits 9 through 15 are not used, bits 16 through 18 contain a use code, bits 19 through 30 contain a lock code, bits 31 through 56 contain a virtual page identifier, and bits 57 through 63 are not used.

The derivation of the absolute address may be explained with reference to FIG. 3 wherein the associative word, containing an absolute page identifier, a use code, a lock code, and a virtual page identifier is provided by a page table, and a virtual address is likewise provided from the job program (See FIG. 1). The virtual page identifier of an associative word is compared to the identifier of a virtual address (e.g. from the job program), and if a match occurs, the absolute page identifier from the associative word is forwarded to the storage address register and a word identifier is transferred from the virtual address to the storage address register for access to memory. As shown in FIG. 3, in the case of a small page, the virtual page identifier contained in bits 31 through 63 of the associative word is compared against an identifier contained in bits 16 through 48 of the virtual address, and if a coincidence occurs, an absolute page identifier at bits 5 through 15 of the associative word are transferred to bit positions 38 through 48 of the storage address register, while a word identifier contained in bits 49 through 54 of the virtual address is transferred to the storage address register and stored therein at bit positions 49 through 54. In the case of a large word, a virtual page identifier contained in bit positions 31 through 56 of the associative word is compared against an identifier in bit position 16 through 41 of the virtual address, and upon a coincidence thereof, the absolute page identifier of the associative word contained in bits 5 through 8 of the associative word is transferred to bit position 38 through 41 of the storage address register and a word identifier contained in bit positions 42 through 54 of the virtual address is transferred to the storage address register to bit positions 42 through 54 thereof. Therefore, the storage address register will contain the absolute address of the data or information to be accessed from the central memory.

Figure 4:
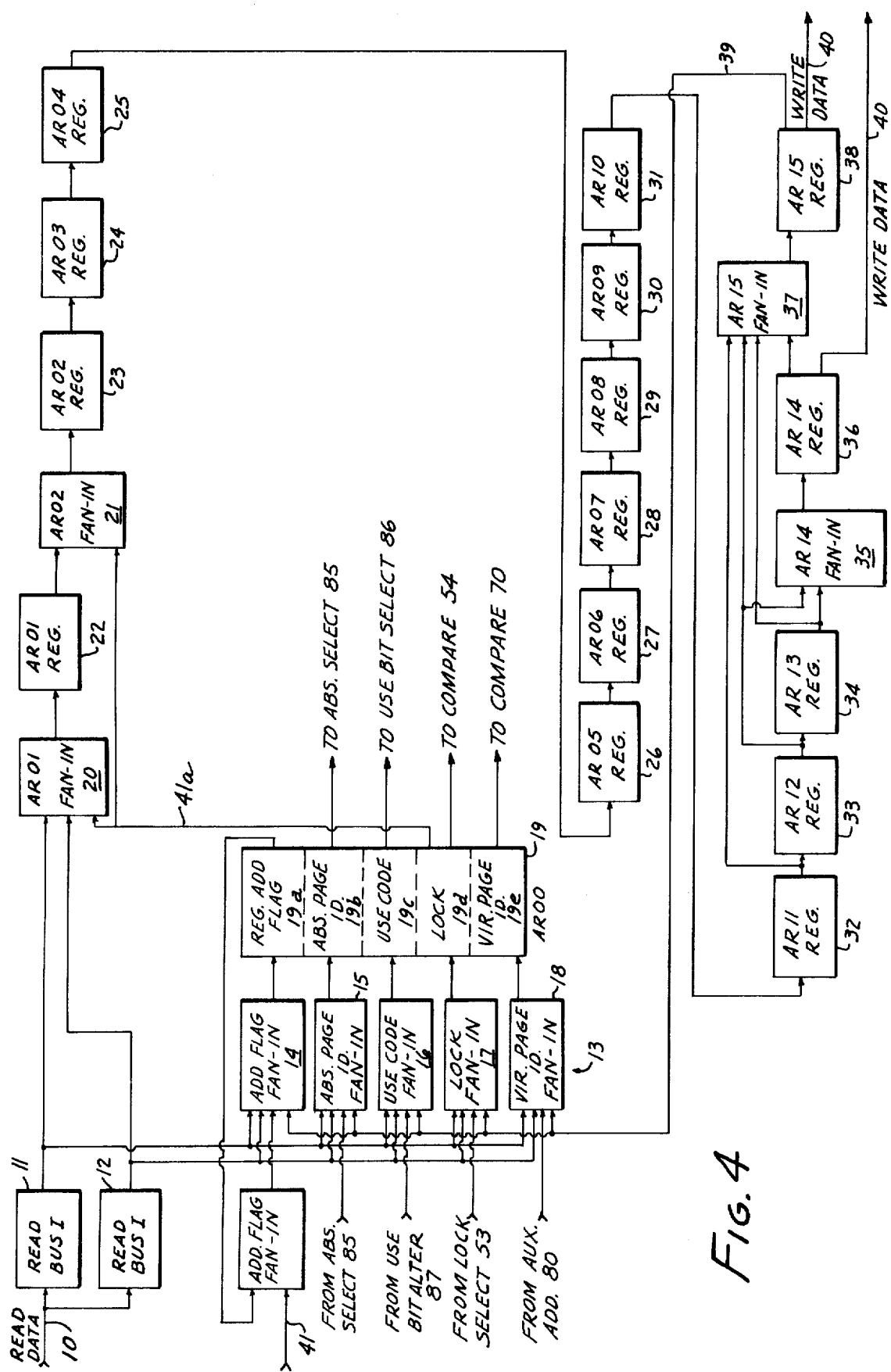
FIGS. 4 and 5 are block circuit diagrams of apparatus in accordance with the presently preferred embodiment of the present invention.
Figure 5:
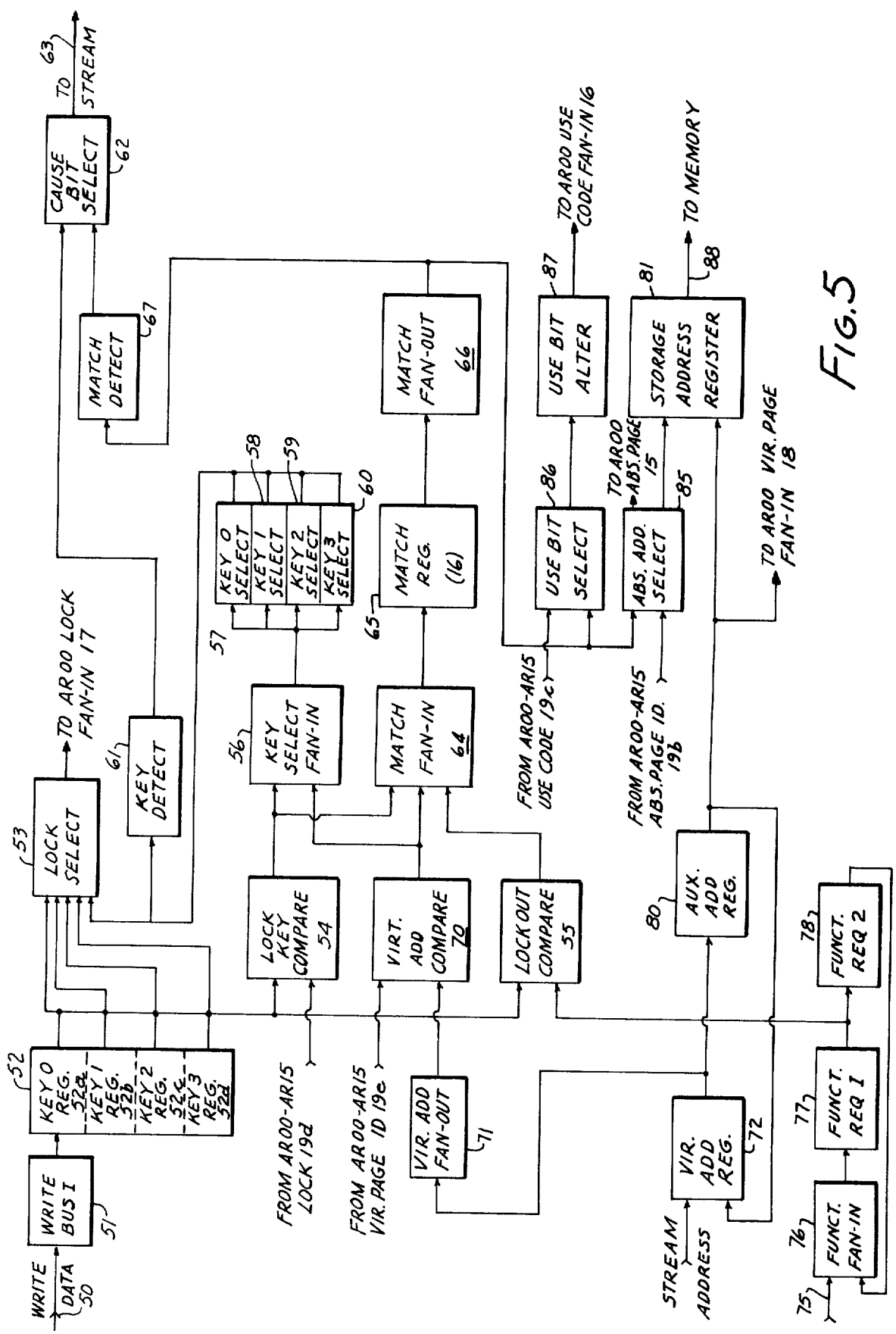

FIGS. 4 and 5 illustrate a block circuit diagram in accordance with the presently preferred embodiment of the present invention for accomplishing the addressing techniques in accordance with the present invention. As illustrated particularly in FIG. 4, data is read from read bus 1 via channel 10 by read circuits 11 and 12. Both read circuits provide outputs to a fan-in circuit 13 comprising address flag fan-in circuit 14, absolute page identifier fan-in circuit 15, usage code fan-in circuit 16, a lock code fan-in circuit 17, and a virtual page identifier fan-in circuit 18. Fan-in circuit 13, comprising the individual fan-in apparatus 14 through 18, provides inputs to a first register 19 designated associative register AROO. This register includes a register address flag 19a, an absolute page identifier 19b, a usage code 19c, a lock code 19d, and a virtual page identifier 19e. Read data is also provided from read circuits 11 and 12 to associative register AR01 fan-in circuit 20. Additionally, associative register AR00 provides an output via channel 41a to fan-in circuit 20 and to fan-in circuit 21 which in turn is the fan-in circuit for associative register AR02. Associative register AR01 identified by reference numeral 22 receives an input from fan-in 20 and provides an output to fan-in circuit 21 which in turn provides an output to register 23 which is associative register AR02. Associative register AR02 provides an output to register 24 and thereafter to registers 25, 26, 27, 28, 29, 30, 31 and 32, in sequence. As illustrated in the drawings, registers 23 through 32 are each associative registers and are wired in sequence so that the contents of the previous register are forwarded to a subsequent register. Therefore, registers 23 through 32 are subsequent associative registers designated as associative registers AR02, AR03, AR04, AR05, AR06, AR07, AR08, AR09, AR10, and AR11. The eleventh associative register AR11, designated by reference numeral 32, provides an output to register AR12, designated by reference number 33, which in turn provides an output to register AR13, designated reference number 34. Associative register AR13 provides an output to fan-in circuit 35, which in turn provides an output to associative register AR14, designated reference numeral 36. As shown in FIG. 4, the outputs from registers AR11, AR12, AR13 and AR14 are provided to a fan-in circuit 37 for input to register AR15 designated reference numeral 38. Likewise, fan-in circuit 35 receives inputs from both registers AR12 and AR13. Register AR15 provides an output via channel 39 to each of the fan-in circuits of fan-in circuit 13 associated with associative register AR00. Additionally, associative registers AR14 and AR15 provide an output to write data bus I, designated by reference numeral 40. Each register AR00-AR15 is of similar construction to that shown in connection with register AR00. Fan-in circuits 20, 21, 35 and 37 are similar to fan-in circuit 13, except that only fan-in circuit 13 receives inputs from the controls in FIG. 5, and only fan-in circuits 13 and 20 receive inputs from read bus I.

Address flag fan-in circuit 14 receives inputs as heretofore described, and, additionally, inputs from each of the register address flags of registers AR00 through AR15, the exact connection being shown for AR00 whereas other connections being made through channel 41 from registers AR01 through AR15.

The loading of the associative word registers may now be explained.

follows: at time T0, associative words 14 and 15 are read from read bus 1 into registers AR00 and AR01 through the respective read circuits 11 and 12 (FIG. 4). During the next cycle, T1, associative word 15 is transferred to associative register AR02. During time cycle T2, associative word 15 is transferred to associative register AR03, associative word 14 is transferred to associative register AR02, and associative words 12 and 13 are read into associative registers AR00 and AR01, respectively. The process continues through time T11 when associative word 15 has moved to associative register AR12. During the next time cycle, T12, associative word 15 is transferred to both registers AR13 and AR15, during the next time cycle, T13, associative word 14 moves to register AR13, and during time cycle T14, associative word 14 moves to register AR14 thereby fully loading the associative registers AR00 through AR15. The following Table I denotes the loading of each associative register at each time T0 through T14.

TABLE I

| REG. | ASSOCIATIVE REGISTER LOADING TIME | | | | | | | | | | | | | | |
|------|----|----|----|----|----|----|----|----|----|----|-----|-----|-----|-----|-----|
|      | T0 | T1 | T2 | T3 | T4 | T5 | T6 | T7 | T8 | T9 | T10 | T11 | T12 | T13 | T14 |
| AR00 | 14 | 14 | 12 | 12 | 10 | 10 | 8  | 8  | 6  | 6  | 4   | 4   | 2   | 2   | 0   |
| AR01 | 15 | 15 | 13 | 13 | 11 | 11 | 9  | 9  | 7  | 7  | 5   | 5   | 3   | 3   | 1   |
| AR02 |    | 15 | 14 | 13 | 12 | 11 | 10 | 9  | 8  | 7  | 6   | 5   | 4   | 3   | 2   |
| AR03 |    |    | 15 | 14 | 13 | 12 | 11 | 10 | 9  | 8  | 7   | 6   | 5   | 4   | 3   |
| AR04 |    |    |    | 15 | 14 | 13 | 12 | 11 | 10 | 9  | 8   | 7   | 6   | 5   | 4   |
| AR05 |    |    |    |    | 15 | 14 | 13 | 12 | 11 | 10 | 9   | 8   | 7   | 6   | 5   |
| AR06 |    |    |    |    |    | 15 | 14 | 13 | 12 | 11 | 10  | 9   | 8   | 7   | 6   |
| AR07 |    |    |    |    |    |    | 15 | 14 | 13 | 12 | 11  | 10  | 9   | 8   | 7   |
| AR08 |    |    |    |    |    |    |    | 15 | 14 | 13 | 12  | 11  | 10  | 9   | 8   |
| AR09 |    |    |    |    |    |    |    |    | 15 | 14 | 13  | 12  | 11  | 10  | 9   |
| AR10 |    |    |    |    |    |    |    |    |    | 15 | 14  | 13  | 12  | 11  | 10  |
| AR11 |    |    |    |    |    |    |    |    |    |    | 15  | 14  | 13  | 12  | 11  |
| AR12 |    |    |    |    |    |    |    |    |    |    |     | 15  | 14  | 13  | 12  |
| AR13 |    |    |    |    |    |    |    |    |    |    |     |     | 15  | 14  | 13  |
| AR14 |    |    |    |    |    |    |    |    |    |    |     |     |     |     | 14  |
| AR15 |    |    |    |    |    |    |    |    |    |    |     |     | 15  | 15  | 15  |

Referring to FIG. 6, there is diagrammatically illustrated a representation of a portion of the central memory containing associative words. For purposes of explanation, let it be assumed that associative word 0 appears at absolute address 4000, that associative word 15 appears at absolute address 43CO, that associative word 16 appears at absolute address 4400, and that the last associative word contains an end of table (EOT) code. There may be any number of associative words in memory, but for purposes of explanation, the associative words 16 et seq., contained in memory, will be designated as the "space table". Associative words 0 through 15 are to be read into associative registers AR00 through AR15, respectively. Further, and as will be more fully understood hereinafter, it is preferred to read the associative words in reverse order so that associative word 15 appearing at absolute address 43CO is read first into register AR00, and will be shifted through the associative registers to finally appear in register AR15 at the same time that associative word 0 appearing at absolute address 4000 appears in associative AR00. The sequence for accomplishing the reading or loading of the associative word registers is as Similarly, data within associative registers AR00 through AR15 may be stored in central memory in reverse order through registers AR14 and AR15 connected to write data buses 1. Thus, the contents of registers AR15 and AR14 are written into memory, in reverse order, commencing with absolute address 43CO (FIG. 6). Thus, at time T0, the contents of registers AR15 and AR14 are forwarded to memory so that at time T2 the contents of register AR13 are forwarded to register AR15 and the contents of AR12 are forwarded to both registers AR13 and AR14. Also at time T2, the contents of register AR02-AR11 are shifted one position. At time T3 the register contents are again shifted. The process continues until the associative words in registers AR00 through AR15 are fully loaded into memory in reverse order thereby re-establishing the order previously existing in memory so that the associative word 0 appears at absolute address 4000 and associative word 15 appears at its absolute address 4300. Thus, Table II illustrates the timing aspects of writing the associative words from associative registers AR00 through AR15 to memory.

TABLE II

| REG. | ASSOCIATIVE REGISTER STORING TIME | | | | | | | | | | | | | | |
|------|----|----|----|----|----|----|----|----|----|----|-----|-----|-----|-----|-----|
|      | T0 | T1 | T2 | T3 | T4 | T5 | T6 | T7 | T8 | T9 | T10 | T11 | T12 | T13 | T14 |
| AR00 | 0  | 0  | 0  |    |    |    |    |    |    |    |     |     |     |     |     |
| AR01 | 1  | 1  | 1  |    |    |    |    |    |    |    |     |     |     |     |     |
| AR02 | 2  | 2  | 1  | 0  |    |    |    |    |    |    |     |     |     |     |     |

TABLE II-continued

| REG. | ASSOCIATIVE REGISTER STORING TIME | | | | | | | | | | | | | | |
|---|---|---|---|---|---|---|---|---|---|---|---|---|---|---|---|
| | T0 | T1 | T2 | T3 | T4 | T5 | T6 | T7 | T8 | T9 | T10 | T11 | T12 | T13 | T14 |
| AR03 | 3 | 3 | 2 | 1 | 0 | | | | | | | | | | |
| AR04 | 4 | 4 | 3 | 2 | 1 | 0 | | | | | | | | | |
| AR05 | 5 | 5 | 4 | 3 | 2 | 1 | 0 | | | | | | | | |
| AR06 | 6 | 6 | 5 | 4 | 3 | 2 | 1 | 0 | | | | | | | |
| AR07 | 7 | 7 | 6 | 5 | 4 | 3 | 2 | 1 | 0 | | | | | | |
| AR08 | 8 | 8 | 7 | 6 | 5 | 4 | 3 | 2 | 1 | 0 | | | | | |
| AR09 | 9 | 9 | 8 | 7 | 6 | 5 | 4 | 3 | 2 | 1 | 0 | | | | |
| AR10 | 10 | 10 | 9 | 8 | 7 | 6 | 5 | 4 | 3 | 2 | 1 | 0 | | | |
| AR11 | 11 | 11 | 10 | 9 | 8 | 7 | 6 | 5 | 4 | 3 | 2 | 1 | 0 | | |
| AR12 | 12 | 12 | 11 | 10 | 9 | 8 | 7 | 6 | 5 | 4 | 3 | 2 | 1 | 0 | |
| AR13 | 13 | 13 | 12 | 11 | 10 | 9 | 8 | 7 | 6 | 5 | 4 | 3 | 2 | 1 | 0 |
| AR14 | 14 | | 12 | | 10 | | 8 | | 6 | | 4 | | 2 | | 0 |
| AR15 | 15 | | 13 | | 11 | | 9 | | 7 | | 5 | | 3 | | 1 |

In FIG. 5, a write data bus 50 is applied to a write circuit 51 which in turn provides an input to key registers 52. Registers 52 contain a plurality of key codes designated 52a, 52b, 52c, and 52d. The output of register 52 is provided to an input of lock select 53 which in turn provides an output to lock fan-in circuit 17 of register AR00 in FIG. 4. Additionally, an output from register 52 is provided as an input to lock-key compare circuit 54, which receives a second input from lock circuit 19d in FIG. 4 of registers AR00-AR15. An output from register 52 also provides an input to lock-out compare circuit 55. Compare circuit 54 provides an input to key select fan-in circuit 56 which in turn provides an input to individual ones of key select circuits 57, 58, 59 and 60. The outputs of select circuits 57 through 60 are provided as inputs to lock select 53 and to key detect circuit 61. The output of key detect circuit 61 is provided as an input to cause bit select circuit 62 which provides an output to the stream unit via channel 63. Compare circuit 54 further provides an output to match fan-in circuit 64 which in turn provides an input to match registers 65. Preferably, there are equal number of match registers as there are associative registers and, in the specific example given, there are sixteen match registers 65. Match registers 65 provide an output to match fan-out circuit 66 which in turn provides an output to match detect circuit 67 which provides an output to cause bit select 62. Select 62 provides data to the stream unit, or buffer, to advise the stream unit as to the cause of any access interrupts. The virtual page identifier code from circuit 19e of registers AR00-AR15 in FIG. 1 is provided as an input to virtual address compare 70 which receives a second input from virtual address fan-out circuit 71 which in turn receives an input from virtual address register 72. Virtual address register 72 receives stream addresses from memory. Virtual address compare 70 provides an input to key select fan-in circuit 56 and to match fan-in circuits 64.

A function signal is inputted via channel 75 to function control fan-in circuit 76 which in turn provides sequential outputs to function request circuits 77 and 78, the output of function request 77 being connected to lock out compare circuit 55 and to function request circuit 78, and the output of function request circuit 78 being provided as an input to function fan-in circuit 76. Virtual address register 72 provides an output to auxilliary address register 80 which in turn provides outputs to storage address register 81, to AR00 virtual page fan-in circuit 18 in FIG. 4, and to virtual address register 72. Absolute address select circuit 85 receives an input from AR00-AR15 absolute page identifiers 19b in FIG. 4 and from match fan-out circuit 66. Absolute address select circuit 85 provides an output to AR00 absolute page identifier fan-in circuit 15 in FIG. 4, and to the storage address register 81. The output AR00-AR15 usage code 19c is applied to usage bit select circuit 86 which in turn provides an output to usage bit alter circuit 87 for input to AR00 usage bit fan-in circuit 16 in FIG. 4. Also, use bit select circuit 86 receives an input from match fan-out circuit 66. Storage address register 81 provides an output via channel 88 to central memory.

Prior to a discussion of the operation as to the manner of searching the associative registers to establish an absolute address, it is believed that a description of the usage code of the associative word format is in order. Thus, and with reference to FIG. 2, there is shown a 3-bit usage code at bit positions 16 through 18 of the associative word format. It should be noted that the usage code appears in both the small and large page associative word format. The usage code is a 3-bit code and may be best be explained with reference to the following Table III.

TABLE III

| CODE | USAGE CODE MEANING |
|---|---|
| 000 | End of Table; no more pages appearing in the table at subsequent absolute addresses. |
| 001 | Null Code; does not identify a page stored in memory. |
| 010 | Small (512-word) page that has not been referenced by CPU. |
| 011 | Large (65,536-word) page that has not been referenced by CPU. |
| 100 | Small page that has been referenced by CPU; the CPU has read a word from the page. |
| 101 | Large page that has been referenced by CPU; the CPU has read a word from the page. |
| 110 | Small page that has been altered by CPU; at least one bit in page has been altered. |
| 111 | Large page that has been altered by CPU; at least one bit in page has been altered. |

Therefore, the usage code can indicate an end-of-page table, a null condition of the associative word, whether a page has or has not been referenced by the CPU or whether it has been altered by the CPU.

With reference particularly to FIGS. 1, 4 and 5, let it be assumed that the job program includes a request for information or data from the central memory, and that the associative word associated with the absolute address of such data or information is contained in one of the associative registers AR00 through AR15. The virtual address supplied by the program is forwarded to virtual address register 72 (FIG. 5) and thereafter forwarded to virtual address fan-out circuit 71 to virtual address compare circuit 70. The associative words associated with each of associative registers AR00 through AR15 are supplied as a second input to virtual address compare circuit 70. If a correspondence is established between the virtual page identifier of both the associative word and the virtual address, an input is made to match fan-in circuit 64 and thereafter to match registers 65. Match registers 65 contain information as to where the coincidence between the virtual address and the corresponding associative word occurred, namely which one of the associative word registers contain the proper word. An output via match fan-out circuit 66 to absolute address select circuits 85 provides selection of the associative word. The absolute page identifier from circuit 19b (FIG. 4) is supplied to absolute address select circuit 85 to select the absolute address which in turn is stored in storage address register 81. The word identifier of the virtual address is forwarded from register 72 to register 80 for input to register 81 to complete the absolute address. The match register 65 also causes the selected associative word in one of registers AR00 through AR15 to be forwarded through circuits 85, 87, 53, and 80 and via channel 41 to fan-in circuit 13 for direct input to register AR00. All associative words previously preceding the selected word are shifted down one position in the associative word registers. Thus, when the appropriate associative word appears in register AR00, the virtual page identifier will appear in circuit 19e for input to virtual address compare 70 to indicate to the match registers that the sought for associative word is now in register AR00. The absolute address is thus formed in storage address register 81 for access to memory via channel 88.

Heretofore, it has been assumed that the associative word associated with the absolute address for the data or information in central memory has been previously stored in one of the associative registers AR00 through AR15. In the following discussion it will be assumed that the desired associative word which will make a match with the virtual page identifier from the job program is not stored in one of the associative registers AR00 through AR15.

As heretofore explained, during a stream request for data from memory, the associative registers are compared for a match between the associative word and the virtual page identifier, and if such match appears, the word appearing in the selected associative register is read into register AR00 and other words are shifted one position. The absolute address is forwarded to the storage address register 81 and thence to memory to retrieve the desired word.

Assuming that the associative word does not appear in the associative registers AR00 through AR15, the match registers are not set. The usage code is examined from circuit 19c to determine if an end-of-table use code appears in the associative registers. If so, an interrupt cycle is accessed to halt further streaming of information from central memory via apparatus (not shown). However, if the end-of-table code does not appear in the associative registers, the usage code is examined by usage bit select circuit 86 to determine if a "null" code appears in one of the associative registers. Although the null code usage has not been heretofore described, let it be assumed that for purposes of explanation a null code does not appear in any of the associative registers AR00 through AR15. If such is the case, associative word 15 contained in register AR15 is shifted via channel 39 (FIG. 4) to associative register AR00 and the remaining associative words 0 through 14 are read back to memory via write bus 1 (channel 40) into positions 1 through 14 of the memory, commencing at absolute address 4000. The apparatus is now ready to commence a space table search.

In a space table search, data is read into registers AR00 and AR01 commencing at absolute address 4400 (associative word 16) as the associative words 16 et seq are forwarded into the registers via read data bus 1, associative word 15 is sequenced downwardly through the associative registers. Comparison for the usage code and the virtual page identifier is accomplished in connection with registers AR00 and AR01. Thus, by emptying the contents of 15 of the 16 associative registers, the associative registers AR00 and AR01 are now free to operate on the compare networks to locate the proper associative word in the space table.

Let it be assumed for purposes of example that the 17th associative word contains the match for the virtual page identifier in the operation or job program. Initially, and as shown in Table IV, associative word 15 appears in register AR00. During the next cycle, T0, read bus 1 reads associative words 16 and 17 into registers AR01 and AR00 respectively, thereby shifting the position of associative word 15 to associative register AR02. The compare circuits (FIG. 5) indicates a match with associative word 17. Match flip-flops are set so that when associative word 17 reaches associative register AR13, it is held there for the remainder of the cycle. Thus, the system continues as heretofore described until, as indicated at time cycle T11, the associative words 15 through 23 appear in associative registers AR13 through AR05 in reversed order. During the next cycle, T12, word 15 is moved to associative register AR14 and word 16 is moved to associative word register AR15, so that associative words 15 and 16 are read back into the space table commencing with absolute address 4400 and associative word 15 will appear where former associative word 16 had previously appeard. During the next cycle, T13, associative word 17 is moved to register AR13 so that during the following cycle, T14, the contents of associative word registers AR11 and AR12 are moved to associative word registers AR15 and AR14, respectively. Therefore, the associative words are read back into the space table commencing at an absolute address 4400 in sequential order commencing with associative word 15 followed by 16, followed by 18, followed by 19 and so on, all the time holding associative word 17 in register AR13.

TABLE IV

| REG. | RIPPLE SEARCH OF SPACE TABLE TIME | | | | | | | | | | | | | |
|---|---|---|---|---|---|---|---|---|---|---|---|---|---|---|
| | 1 | T0 | T1 | T2 | T3 | ... | T10 | T11 | T12 | T13 | T14 | T15 | T16 | T17 | T18 |
| AR00 | 15 | 17 | 17 | 19 | 19 | | | | | | | | | | |
| AR01 | | 16 | 16 | 18 | 18 | | | | | | | | | | |

TABLE IV-continued

RIPPLE SEARCH OF SPACE TABLE

| REG. | T0 | T1 | T2 | T3 | ... | T10 | T11 | T12 | T13 | T14 | T15 | T16 | T17 | T18 |
|------|----|----|----|----|-----|-----|-----|-----|-----|-----|-----|-----|-----|-----|
| AR02 | 15 | 16 | 17 | 18 | | | | | | | | | | |
| AR03 | | 15 | 16 | 17 | | | | | | | | | | |
| AR04 | | | 15 | 16 | | 23 | | | | | | | | |
| AR05 | | | | 15 | | 22 | 23 | | | | | | | |
| AR06 | | | | | | 21 | 22 | 23 | | | | | | |
| AR07 | | | | | | 20 | 21 | 22 | 23 | | | | | |
| AR08 | | | | | | 19 | 20 | 21 | 22 | 23 | | | | |
| AR09 | | | | | | 18 | 19 | 20 | 21 | 22 | 23 | | | |
| AR10 | | | | | | 17 | 18 | 19 | 20 | 21 | 22 | 23 | | |
| AR11 | | | | | | 16 | 17 | 18 | 19 | 20 | 21 | 22 | 23 | |
| AR12 | | | | | | 15 | 16 | 17 | 18 | 19 | 20 | 21 | 22 | 23 |
| AR13 | | | | | | | 15 | 16 | 17 | 17 | 17 | 17 | 17 | 17 |
| AR14 | | | | | | | | 15 | | 18 | | 20 | | 22 |
| AR15 | | | | | | | | 16 | | 19 | | 21 | | 23 |

Next, the contents of memory commencing with absolute address 4000 if re-read back into the associative registers in reverse consecutive order until associative word 14 appears in associative register AR12. Thereafter, the process continues by shifting associative word 17 from associative register AR13 to associative register AR15 so that the contents of the associative registers AR00 through AR15 contain associative words 0 through 14 and 17. Thereafter, associative word 17 is read from associative register AR15 through channel 39 to associative register AR00 shifting the other words down one register. Thus, and with reference to Table V, prior to the space table search, the associative words appeared in consecutive order, whereas after the search the associative words appeared in consecutive order except that associative word 17 now appears in register AR00.

TABLE V-continued

| | SPACE TABLE SEARCH | | |
|---|---|---|---|
| | TABLE LOCATION | BEFORE SEARCH | AFTER SEARCH |
| SPACE TABLE | AR15 | 15 | 14 |
| | 4400 | 16 | 15 |
| | 4440 | 17 | 16 |
| | 4480 | 18 | 18 |
| | 44C0 | 19 | 19 |
| | 4500 | 20 | 20 |
| | 4540 | 21 | 21 |
| | 4580 | 22 | 22 |
| | 45C0 | 23 | 23 |
| | 4600 | EOT | EOT |

The timing associated with copying the associative words back from memory into the associative word registers AR00 through AR14 and of shifting associative word 17 to associative register AR00 is illustrated in Table VI.

TABLE VI

RELOAD OF ASSOCIATIVE REGISTERS AFTER SPACE TABLE SEARCH

| REG. | T0 | T1 | T2 | T3 | T4 | T5 | T6 | T7 | T8 | T9 | T10 | T11 | T12 | T13 | T14 | T16 |
|------|----|----|----|----|----|----|----|----|----|----|-----|-----|-----|-----|-----|-----|
| AR00 | 13 | 13 | 11 | 11 | 9 | 9 | 7 | 7 | 5 | 5 | 3 | 3 | 1 | 1 | 0 | 17 |
| AR01 | 14 | 14 | 12 | 12 | 10 | 10 | 8 | 8 | 6 | 6 | 4 | 4 | 2 | 2 | 1 | 0 |
| AR02 | | 14 | 13 | 12 | 11 | 10 | 9 | 8 | 7 | 6 | 5 | 4 | 3 | 2 | 2 | 1 |
| AR03 | | | 14 | 13 | 12 | 11 | 10 | 9 | 8 | 7 | 6 | 5 | 4 | 3 | 3 | 2 |
| AR04 | | | | 14 | 13 | 12 | 11 | 10 | 9 | 8 | 7 | 6 | 5 | 4 | 4 | 3 |
| AR05 | | | | | 14 | 13 | 12 | 11 | 10 | 9 | 8 | 7 | 6 | 5 | 5 | 4 |
| AR06 | | | | | | 14 | 13 | 12 | 11 | 10 | 9 | 8 | 7 | 6 | 6 | 5 |
| AR07 | | | | | | | 14 | 13 | 12 | 11 | 10 | 9 | 8 | 7 | 7 | 6 |
| AR08 | | | | | | | | 14 | 13 | 12 | 11 | 10 | 9 | 8 | 8 | 7 |
| AR09 | | | | | | | | | 14 | 13 | 12 | 11 | 10 | 9 | 9 | 8 |
| AR10 | | | | | | | | | | 14 | 13 | 12 | 11 | 10 | 10 | 9 |
| AR11 | | | | | | | | | | | 14 | 13 | 12 | 11 | 11 | 10 |
| AR12 | | | | | | | | | | | | 14 | 13 | 12 | 12 | 11 |
| AR13 | 17 | 17 | 17 | 17 | 17 | 17 | 17 | 17 | 17 | 17 | 17 | 17 | 14 | 13 | 13 | 12 |
| AR14 | | | | | | | | | | | | | | 14 | 14 | 13 |
| AR15 | 17 | 17 | 17 | 17 | 17 | 17 | 17 | 17 | 17 | 17 | 17 | 17 | 17 | 17 | 17 | 14 |

TABLE V

| | SPACE TABLE SEARCH | | |
|---|---|---|---|
| | TABLE LOCATION | BEFORE SEARCH | AFTER SEARCH |
| ASSOCIATIVE REGISTER | AR00 | 0 | 17 |
| | AR01 | 1 | 0 |
| | AR02 | 2 | 1 |
| | AR03 | 3 | 2 |
| | AR04 | 4 | 3 |
| | AR05 | 5 | 4 |
| | AR06 | 6 | 5 |
| | AR07 | 7 | 6 |
| | AR08 | 8 | 7 |
| | AR09 | 9 | 8 |
| | AR10 | 10 | 9 |
| | AR11 | 11 | 10 |
| | AR12 | 12 | 11 |
| | AR13 | 13 | 12 |
| | AR14 | 14 | 13 |

It will be appreciated that if the space table contains more than 31 associative words, and that if the sought-for associative word is word 32 or following, the associative words are continuously streamed through register AR00 through AR15 until the correct associative word is found so that associative word 15 will finally appear in memory at address 4400. Thus, the sought-for associative word will end up in register AR00 and all other associative words previously ahead of the sought-for associative word will be shifted back one position.

As heretofore explained, the associative word may contain a usage code indicative that the associative word is a null word meaning in particular, that the associative word is not associated with any page in memory. When an associative word containing a null usage code is detected, and a space table search is commenced, instead of shifting associative word 15 to register AR00, the word containing the null code is read to register AR00. The associative words 16 et seq. are read into register AR00-AR15 and the word containing the null code is obliterated. As the sought-for word comes in, it is read to AR00 and a null usage code is inserted into its position. Therefore, all associative words originally appearing after the null code are shifted one position forward in the table and the null code is re-inserted into the position formerly occupied by the associative word matching the virtual page identifier. Thus, and with reference to Table VII, assume that the associative register AR10 contains an associative word containing a null code and that the virtual page identifier will match with the associative word 23 appearing in the space table at absolute address 45Co. A space table search is accomplished as heretofore described with the null usage code appearing in register AR10 being shifted to the position formerly occupied by associative word 23 at absolute address 45Co, and the associative word 23 being shifted to associative register AR00. Only one null is extracted for each space table search.

TABLE VII

SPACE TABLE SEARCH
NULL IN ASSOCIATIVE REGISTER

| TABLE LOCATION | BEFORE SEARCH | AFTER SEARCH |
|---|---|---|
| AR00 | 0 | 23 |
| AR01 | 1 | 0 |
| AR02 | 2 | 1 |
| AR03 | 3 | 2 |
| AR04 | 4 | 3 |
| AR05 | 5 | 4 |
| AR06 | 6 | 5 |
| AR07 | 7 | 6 |
| AR08 | 8 | 7 |
| AR09 | 9 | 8 |
| AR10 | NULL | 9 |
| AR11 | 11 | 11 |
| AR12 | 12 | 12 |
| AR13 | 13 | 13 |
| AR14 | 14 | 14 |
| AR15 | 15 | 15 |
| 4400 | 16 | 16 |
| 4440 | 17 | 17 |
| 4480 | 18 | 18 |
| 44C0 | NULL | NULL |
| 4500 | 20 | 20 |
| 4540 | 21 | 21 |
| 4580 | 22 | 22 |
| 45C0 | 23 | NULL |
| 4600 | EOT | EOT |

Likewise, if the null occurs in the space table, and the match word follows the null, the null is shifted downwardly to occupy the position of the match word. Thus, and with reference to Table VIII, the null code is shifted from absolute address 4480 to absolute address 4540 while associative word 21 is moved from absolute address 4540 to associative register AR00.

TABLE VIII

SPACE TABLE SEARCH
NULL IN SPACE TABLE

| TABLE LOCATION | BEFORE SEARCH | AFTER SEARCH |
|---|---|---|
| AR00 | 0 | 21 |
| AR01 | 1 | 0 |
| AR02 | 2 | 1 |
| AR03 | 3 | 2 |
| AR04 | 4 | 3 |

TABLE VIII-continued

SPACE TABLE SEARCH
NULL IN SPACE TABLE

| TABLE LOCATION | BEFORE SEARCH | AFTER SEARCH |
|---|---|---|
| AR05 | 5 | 4 |
| AR06 | 6 | 5 |
| AR07 | 7 | 6 |
| AR08 | 8 | 7 |
| AR09 | 9 | 8 |
| AR10 | 10 | 9 |
| AR11 | 11 | 10 |
| AR12 | 12 | 11 |
| AR13 | 13 | 12 |
| AR14 | 14 | 13 |
| AR15 | 15 | 14 |
| 4400 | 16 | 15 |
| 4440 | 17 | 16 |
| 4480 | NULL | 17 |
| 44C0 | 19 | 19 |
| 4500 | 20 | 20 |
| 4540 | 21 | NULL |
| 4580 | 22 | 22 |
| 45C0 | 23 | 23 |
| 4600 | EOT | EOT |

To generate a null, and with reference to Table IX, assume that a table containing 23 associative words followed by an associative word containing an end-of-table usage code appears in the associative registers and in the space table. Assume further that a command is made to match with a word not appearing in the table. A space table search is accomplished as heretofore described with each associative word being shifted back one position. Thereafter, to fill the gap at the head of the table, an associative word is inserted containing a null code indicative that the associative word does not match with any page of the space table. The null code is generated by altering the usage code by circuit 87 in FIG. 5.

TABLE IX

NULL GENERATION

| TABLE LOCATION | BEFORE SEARCH | AFTER SEARCH |
|---|---|---|
| AR00 | 0 | NULL |
| AR01 | 1 | 0 |
| AR02 | 2 | 1 |
| AR03 | 3 | 2 |
| AR04 | 4 | 3 |
| AR05 | 5 | 4 |
| AR06 | 6 | 5 |
| AR07 | 7 | 6 |
| AR08 | 8 | 7 |
| AR09 | 9 | 8 |
| AR10 | 10 | 9 |
| AR11 | 11 | 10 |
| AR12 | 12 | 11 |
| AR13 | 13 | 12 |
| AR14 | 14 | 13 |
| AR15 | 15 | 14 |
| 4400 | 16 | 15 |
| 4440 | 17 | 16 |
| 4480 | 18 | 17 |
| 44C0 | 19 | 18 |
| 4500 | 20 | 19 |
| 4540 | 21 | 20 |
| 4580 | 22 | 21 |
| 45C0 | 23 | 22 |
| 4600 | EOT | 23 |
| 4640 | | EOT |

With reference to FIGS. 2 and 3, it is shown that the associative word contains a "lock" code, which is a program protection code. The lock code is forwarded in FIG. 4 to lock circuits 19d and thence to compare circuits 54 in FIG. 5. A "key" word is inserted via write bus 51 into register 52 and contains four keys having a format as illustrated in FIG. 7. As shown in FIG. 7, and with reference to FIG. 5, four key codes are provided which are loaded from the instruction or IO portions of the computer into register 52. Each key code is preceded by an appropriate lock-out code containing three bits. When the lock code of an associative word corresponds to a key code, the absolute page identifier is permitted to perform the operations hereinbefore described. If no match occurs between the lock code and one of the four key codes, access to the page of memory is inhibited. The lock-out codes associated with each key locks out certain operations from occuring in connection with the absolute addressing. Thus, if the first bit of the lock-out code of a particular associated key is set, the CPU may be locked-out from write operations, if the second bit is set the CPU may be locked out from read operations, and if the third bit is set the CPU may be locked-out from instruction references. Using the lock-out and key codes, the absolute addresses may be manipulated for operation for specific functions while locking out other functions. Lock selection is forwarded back to the lock fan-in circuit 17 in FIG. 4 as illustrated in the drawings. Further, a comparison of the key and lock codes by compare circuits 54, will select a particular key function via circuits 5/ through 60 in FIG. 5 to operate the cause bit select circuit 62.

The present invention thus provides addressing apparatus to permit formulation of an absolute address for reference to the central memory of a computer. One feature of the invention resides in the fact that frequently used addresses are given priority in an associative register table, whereas less commonly used addresses are sequentially moved downward in the table in a ripple effect. In the event that a search is commenced in the table for an address not in an associative register, the lowest ordered address in the associative register is moved to the highest ordered position of the space table with the other words moved to memory. The matching word is detected as it streams through the registers and is placed in highest priority. The register contents are returned to memory and the prior contents are returned to the registers.

Further, through manipulation of the registers, gaps which might normally occur between the associative words stored in memory are closed automatically to avoid expending time in searching empty registers and memory locations.

This invention is not to be limited by the embodiment shown in the drawings and described in the description, which is given by way of example and not limitation, but only in accordance with the scope of the appended claims:

What is claimed is:

1. Apparatus for forming an absolute address for accessing a memory of a computer comprising, in combination:
    a plurality of ordered register means each being capable of storing a respective associative word, each associative word having a respective absolute page identifier and a respective virtual page identifier, said register means being arranged in sequential order;
    read means for sequentially reading associative words from said memory into the highest ordered register means;
    shift means for sequentially shifting associative words from a higher ordered register means to a lower ordered register means;
    receiver means for receiving a virtual address from a job program, said virtual address having a virtual page identifier and a virtual word identifier;
    compare means connected to said receiver means and at least one of said register means for comparing the virtual page identifier of said virtual address in said receiver means with the virtual page identifier in said one of said register means, said compare means providing a signal indicative of the correspondence or non-correspondence between the virtual page identifier of said virtual address and the virtual page identifier of the associative word in said any of said register means;
    first control means, responsive to the signal indicative that said compare means senses a correspondence between the virtual page identifier of said virtual address and a virtual page identifier of an associative word,
        for transferring the associative word containing the corresponding virtual page identifier from a lower ordered register means to the highest ordered register means, and
        for operating said shift means to shift associative words, previously stored in register means having a higher order than the said lower ordered register means from which the transferred associative word was transferred, to the next lower ordered register means; and
    storage address register means responsive to said compare means for storing the absolute page identifier of the associative word containing said corresponding virtual page identifier.

2. Apparatus according to claim 1 further including means for storing the word identifier from said virtual address in said storage address register means.

3. Apparatus according to claim 1 wherein said associative words each contain a use code, said first control means being responsive to a predetermined use code in an associative word stored in one of said register means for further operating said shift means to shift said associative word from said one register means to a lower ordered register means from where an associative word was transferred to the highest ordered register means.

4. Apparatus according to claim 3 further including means for storing the word identifier from said virtual address in said storage address register means.

5. Apparatus according to claim 1 further including write means for writing associative words into said memory from said plurality of register means,
    second control means, responsive to the signal indicative that said compare means senses a non-correspondence between the virtual page identifier of said virtual address and a virtual page identifier of an associative word in said register means,
        for selectively operating said write means to sequentially write associative words to said memory from all of said register means except the lowest ordered register means, and
        for operating said read means to sequentially read additional associative words from said memory into the highest ordered register means, and
        for operating said shift means to shift said additional associative words to lower ordered register means,
    said compare means comparing the virtual page identifier of said virtual address with the virtual page identifier in said one register means for providing a further signal indicative of the correspondence between the virtual page identifier of said virtual address and the virtual page identifier of the additional associative word in said any of said register means, said second control means being responsive to said further signal to operate said write means to write all associative words stored in said plurality of register means into said memory except that associative word containing virtual page identifier which corresponds to the virtual page identifier in said virtual address, and to operate said read means to sequentially read back to said register means those associative words which were written into said memory under control of said second control means when said second control means responded to the first-named signal, and to operate said shift means to shift the associative word containing the virtual page identifier which corresponds to the virtual page identifier in said virtual address to the highest ordered register means, whereby the associative word containing the virtual page identifier corresponding to the virtual page identifier of virtual address is thereupon stored in the highest ordered register means, the associative words previously stored in all except the lowest ordered register means are thereupon stored in sequence in the register means next following the highest ordered register means, and the associative word previously stored in the lowest ordered register means is thereupon stored in memory in a higher ordered position than said additional associative words written into said memory from said register means.

6. Apparatus according to claim 5 futher including means for storing the word identifier from said virtual address in said storage address register means.

7. Apparatus according to claim 5 wherein said associative words each contain a use code, said first control means being responsive to a predetermined use code in an associative word stored in one of said register means for further operating said shift means to shift said associative word from said one register means to a lower ordered register means from where an associative word was transferred to the highest ordered register means.

8. Apparatus according to claim 7 further including means for storing the word identifier from said virtual address in said storage address register means.

* * * * *